United States Patent
Radi

(10) Patent No.: US 11,899,585 B2
(45) Date of Patent: Feb. 13, 2024

(54) IN-KERNEL CACHING FOR DISTRIBUTED CACHE

(71) Applicant: Western Digital Technologies, Inc., San Jose, CA (US)

(72) Inventor: Marjan Radi, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 40 days.

(21) Appl. No.: 17/561,898

(22) Filed: Dec. 24, 2021

(65) Prior Publication Data

US 2023/0205695 A1     Jun. 29, 2023

(51) Int. Cl.
*G06F 12/084*     (2016.01)
*G06F 9/54*     (2006.01)

(52) U.S. Cl.
CPC ............ *G06F 12/084* (2013.01); *G06F 9/545* (2013.01); *G06F 2212/314* (2013.01)

(58) Field of Classification Search
None
See application file for complete search history.

(56) References Cited

U.S. PATENT DOCUMENTS

| | | | |
|---|---|---|---|
| 8,412,907 B1 | 4/2013 | Dunshea et al. | |
| 8,700,727 B1 * | 4/2014 | Gole | H04L 67/104 709/213 |
| 10,362,149 B2 | 7/2019 | Biederman et al. | |
| 10,530,711 B2 | 1/2020 | Yu et al. | |
| 10,754,707 B2 | 8/2020 | Tamir et al. | |
| 10,757,021 B2 | 8/2020 | Man et al. | |
| 11,134,025 B2 | 9/2021 | Billore et al. | |
| 11,223,579 B2 | 1/2022 | Lu | |
| 2014/0143365 A1 | 5/2014 | Guerin et al. | |
| 2015/0006663 A1 | 1/2015 | Huang | |
| 2015/0319237 A1 | 11/2015 | Hussain et al. | |
| 2017/0163479 A1 | 6/2017 | Wang et al. | |
| 2017/0269991 A1 | 9/2017 | Bazarsky et al. | |
| 2018/0191632 A1 | 7/2018 | Biederman et al. | |

(Continued)

FOREIGN PATENT DOCUMENTS

| | | |
|---|---|---|
| CN | 106603409 A | 4/2017 |
| CN | 112351250 A | 2/2021 |

(Continued)

OTHER PUBLICATIONS

Brad Fitzpatrick. "Distributed Caching with Memcached." Aug. 2004. Linux Journal. https://www.linuxjournal.com/article/7451.*

(Continued)

*Primary Examiner* — Nathan Sadler
(74) *Attorney, Agent, or Firm* — Barry IP Law, P.C.

(57) ABSTRACT

A client device including at least one memory configured to be used at least in part as a shared cache in a distributed cache. A network interface of the client device is configured to communicate with one or more other client devices on a network with each of the one or more other client devices configured to provide a respective shared cache for the distributed cache. At least one processor of the client device is configured to execute a kernel of an Operating System (OS) for allocating resources of the client device. The kernel is configured to access data for the distributed cache in the shared cache, which is located in a kernel space of the at least one memory.

20 Claims, 4 Drawing Sheets

(56) References Cited

U.S. PATENT DOCUMENTS

| | | |
|---|---|---|
| 2018/0341419 A1 | 11/2018 | Wang et al. |
| 2018/0357176 A1 | 12/2018 | Wang |
| 2019/0227936 A1 | 7/2019 | Jang |
| 2019/0280964 A1 | 9/2019 | Michael et al. |
| 2020/0034538 A1 | 1/2020 | Woodward et al. |
| 2020/0201775 A1 | 6/2020 | Zhang et al. |
| 2020/0274952 A1 | 8/2020 | Waskiewicz et al. |
| 2020/0285591 A1 | 9/2020 | Luo et al. |
| 2020/0322287 A1 | 10/2020 | Connor et al. |
| 2020/0403905 A1 | 12/2020 | Allen et al. |
| 2021/0019197 A1 | 1/2021 | Tamir et al. |
| 2021/0058424 A1 | 2/2021 | Chang et al. |
| 2021/0149763 A1 | 5/2021 | Ranganathan et al. |
| 2021/0157740 A1 | 5/2021 | Benhanokh et al. |
| 2021/0240621 A1 | 8/2021 | Fu et al. |
| 2021/0266253 A1 | 8/2021 | He et al. |
| 2021/0320881 A1 | 10/2021 | Coyle et al. |
| 2021/0377150 A1 | 12/2021 | Dugast et al. |
| 2022/0035698 A1 | 2/2022 | Vankamamidi et al. |
| 2022/0294883 A1 | 9/2022 | Pope et al. |
| 2022/0350516 A1 | 11/2022 | Bono et al. |
| 2022/0357886 A1 | 11/2022 | Pitchumani et al. |

FOREIGN PATENT DOCUMENTS

| | | |
|---|---|---|
| EP | 3358456 A1 | 8/2018 |
| EP | 3598309 B1 | 5/2022 |
| KR | 1020190090131 A | 8/2019 |
| WO | 2018086569 A1 | 5/2018 |
| WO | 2018145725 A1 | 8/2018 |
| WO | 2021226948 A1 | 11/2021 |

OTHER PUBLICATIONS

Roderick W. Smith. The Definitive Guide to Samba 3. 2004. APress Media. pp. 332-336.*

Bijlani et al. "Extension Framework for File Systems in User space." Jul. 2019. USENIX. 2019 USENIX ATC. pp. 121-134.*

Wu et al. "NCA: Accelerating Network Caching with express Data Path." Nov. 2021. IEEE. HotICN 2021. pp. 141-146.*

Patterson et al. Computer Architecture: A Quantitative Approach. 1996. Morgan Kaufmann. 2nd ed. pp. 378-380.* maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

International Search Report and Written Opinion dated Oct. 25, 2022 from International Application No. PCT/US2022/030414, 11 pages.

Ghigoff et al, "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.

International Search Report and Written Opinion dated Sep. 30, 2022 from International Application No. PCT/US2022/029527, 9 pages.

Baidya et al.; "eBPF-based Content and Computation-aware Communication for Real-time Edge Computing"; IEEE International Conference on Computer Communications (INFOCOM Workshops); May 8, 2018; available at https://arxiv.org/abs/1805.02797.

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2_.pdf.

Kourtis et al.; "Safe and Efficient Remote Application Code Execution on Disaggregated NVM Storage with eBPF"; Feb. 25, 2020; 8 pages; available at https://arxiv.org/abs/2002.11528.

Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.

Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.

International Search Report and Written Opinion dated Nov. 18, 2022 from International Application No. PCT/US2022/030437, 10 pages.

Bachl et al.; "A flow-based IDS using Machine Learning in EBPF"; Cornell University;Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/350182568_Kernel-level_tracing_for_detecting_stegomalware_and_covert_channels_in_Linux_environments.

Dimolianis et al.; "Signature-Based Traffic Classification and Mitigation for DDOS Attacks Using Programmable Network Data Planes"; IEEE Access; Jul. 7, 2021; available at: https://ieeexplore.ieee.org/stamp/stamp.jsp?arnumber=9511420.

Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Pending U.S. Appl. No. 17/571,922, filed Jan. 10, 2022, entitled "Computational Acceleration for Distributed Cache", Marjan Radi.

Pending U.S. Appl. No. 17/665,330, filed Feb. 4, 2022, entitled "Error Detection and Data Recovery for Distributed Cache", Marjan Radi.

Pending U.S. Appl. No. 17/683,737, filed Mar. 1, 2022, entitled "Detection of Malicious Operations for Distributed Cache", Marjan Radi.

Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.

Pinto et al; "Hoard: A Distributed Data Caching System to Accelerate Deep Learning Training on the Cloud"; arXiv; Dec. 3, 2018; available at: https://arxiv.org/pdf/1812.00669.pdf.

(56) References Cited

OTHER PUBLICATIONS

International Search Report and Written Opinion dated Oct. 7, 2022 from International Application No. PCT/US2022/030044, 10 pages.

Sabella et al.; "Using eBPF for network traffic analysis"; available at: Year: 2018; https://www.ntop.org/wp-content/uploads/2018/10/Sabella.pdf.

Pending U.S. Appl. No. 17/829,712, filed Jun. 1, 2022, entitled "Context-Aware NVMe Processing in Virtualized Environments", Marjan Radi.

Tu et al.; "Bringing the Power of eBPF to Open vSwitch"; Linux Plumber 2018; available at: http://vger.kernel.org/pc_net2018_talks/ovs-ebpf-afxdp.pdf.

Pending U.S. Appl. No. 17/836,927, filed Jun. 9, 2022 entitled "Resource Allocation in Virtualized Environments", Marjan Radi.

Pending U.S. Appl. No. 17/850,767, filed Jun. 27, 2022 entitled "Memory Coherence in Virtualized Environments", Marjan Radi.

Pending U.S. Appl. No. 17/741,244, filed May 10, 2022, entitled "In-Kernel Cache Request Queuing for Distributed Cache", Marjan Radi.

Pfaff et al.; "The Design and Implementation of Open vSwitch"; Usenix; May 4, 2015; available at: https://www.usenix.org/conference/nsdi15/technical-sessions/presentation/pfaff.

Gao et al.; "OVS-CAB: Efficient rule-caching for Open vSwitch hardware offloading"; Computer Networks; Apr. 2021; available at:https://www.sciencedirect.com/science/article/abs/pii/S1389128621000244.

\* cited by examiner

IN-KERNEL CACHING FOR DISTRIBUTED CACHE

CROSS-REFERENCE TO RELATED APPLICATION

This application is related to U.S. application Ser. No. 17/571,922 titled "COMPUTATIONAL ACCELERATION FOR DISTRIBUTED CACHE", filed on Jan. 10, 2022, which is hereby incorporated by reference in its entirety.

BACKGROUND

Current trends in cloud computing, big data, and Input/Output (I/O) intensive applications have led to greater needs for high performance distributed shared memory systems in terms of low latency, high throughput, and bandwidth. In addition, the growth of real-time and interactive big data applications with often complex computations relies on fast and high-performance memory. Non-Volatile Memory express (NVMe) is an emerging host controller interface originally designed for Peripheral Component Interface express (PCIe)-based Solid State Drives (SSDs) to provide increased performance in terms of Input/Output Operations Per Second (IOPS). Due to the superior performance of NVMe technology in terms of latency and bandwidth, it is becoming the new industry standard for both client devices and data center servers.

Although NVMe can provide low-latency data access, new hardware and software co-design architectures are generally needed to take full advantage of NVMe and support high-speed remote memory access. In this regard, the increase in bandwidth of network devices, such as network interfaces and switches, has increased the overhead on processors, such as Central Processing Units (CPUs). In addition, CPU-centric architectures may no longer be able to keep up with application demands given the trend towards larger data set sizes.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
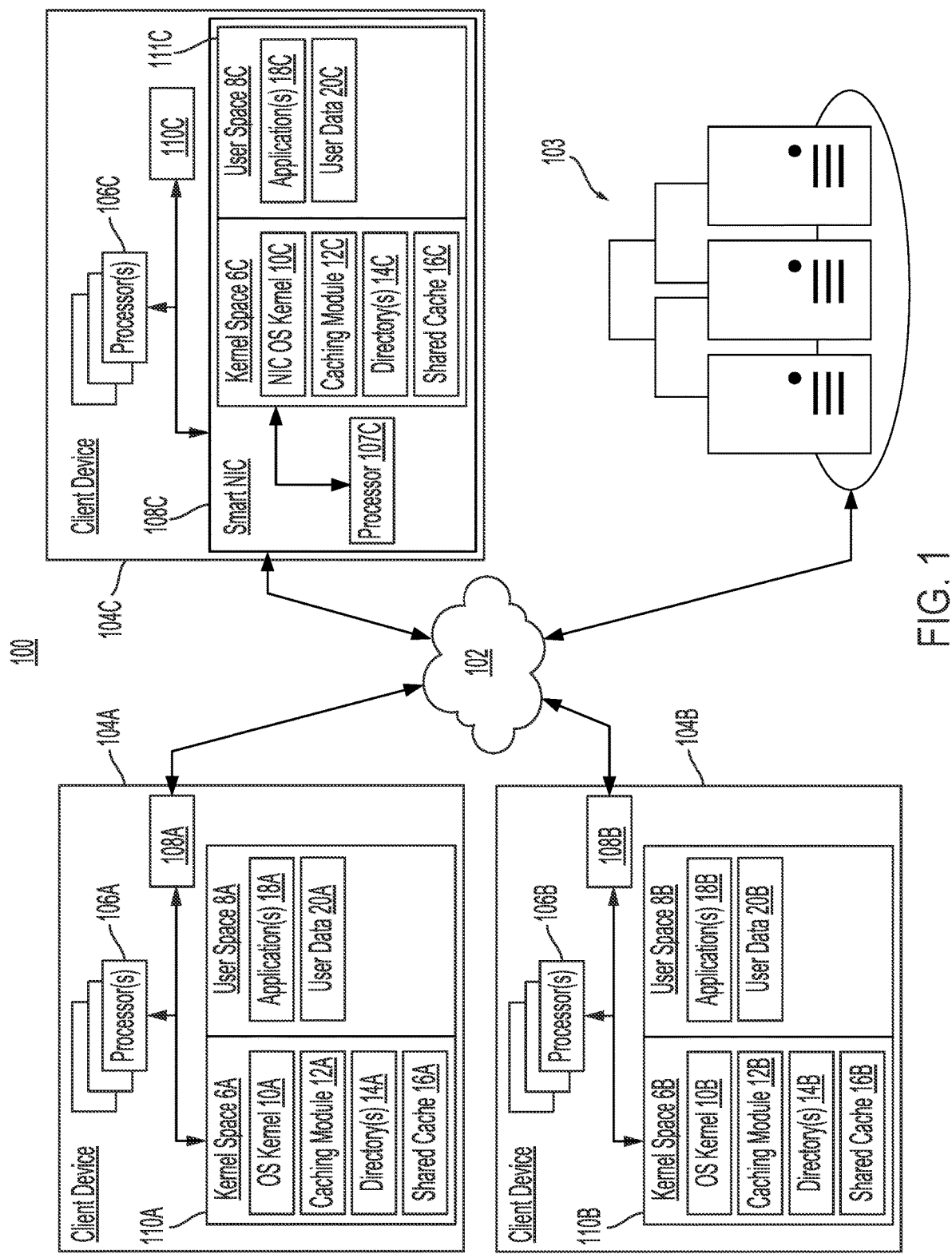
FIG. 1 illustrates an example network environment for implementing in-kernel caching for a distributed cache according to one or more embodiments.

FIG. 1 illustrates an example network environment 100 for implementing in-kernel caching according to one or more embodiments. As shown in FIG. 1, client devices 104A, 104B, and 104C communicate with each other via network 102. In addition, storage devices 103 communicate with client devices 104 via network 102 to provide access to data stored in storage devices 103. Client devices 104 may function as, for example, processing nodes or compute nodes that include one or more processors, such as Reduced Instruction Set Computer (RISC)-V cores or other type of Central Processing Unit (CPU).

Storage devices 103 may function as, for example, storage nodes that store data that can be accessed by client devices 104 and cached locally at client devices 104 as part of a distributed cache. Each storage device of storage devices 103 can include, for example, one or more rotating magnetic disks, and/or non-volatile solid-state memory, such as flash memory. In some implementations, a single storage device 103 may include one or more Solid-State Drives (SSDs) and/or Hard Disk Drives (HDDs). As discussed in more detail below, data retrieved from storage devices 103 or processed by client devices 104 can be cached in respective shared caches 16 at client devices 104 that form a distributed cache to provide faster access to the cached data as compared to retrieving data from storage devices 103.

In some implementations, network environment 100 in FIG. 1 may be used as at least part of a data center and/or for distributed processing, such as for distributed machine learning or big data analysis. As will be appreciated by those of ordinary skill in the art, client devices 104 and storage devices 103 are shown for the purposes of illustration, and network environment 100 can include many more client devices 104 and storage devices 103 than those shown in FIG. 1. In addition, those of ordinary skill the art will appreciate that network environment 100 can include more components than shown in FIG. 1, such as aggregated switches, Top of Rack (ToR) switches, and network controllers, for example.

Network 102 can include, for example, a Storage Area Network (SAN), a Local Area Network (LAN), and/or a Wide Area Network (WAN), such as the Internet. In this regard, client devices 104A, 104B, 104C and storage devices 103 may not be in the same geographic location. Client devices 104 and storage devices 103 may communicate using one or more standards such as, for example, Ethernet.

Each of client devices 104 includes one or more processors 106, a network interface 108, and a memory 110. These components of client devices 104 may communicate with each other via a bus, which can include, for example, a Peripheral Component Interconnect express (PCIe) bus. In some implementations, client devices 104 may include Non-Volatile Memory express over Fabric (NVMeoF) nodes that are configured to communicate with other client devices 104 and storage devices 103 using NVMe messages (e.g., NVMe commands and responses) that may be, for example, encapsulated in Ethernet packets using Transmission Control Protocol (TCP).

In the example of client device 104C, network interface 108C includes its own processor 107C and memory 111C. As discussed below, this arrangement can ordinarily improve the performance of client device 104C in providing access to shared cache 16C. In some implementations, network interface 108C can be programmed using a program language, such as P4, and can include a smart Network Interface Card (NIC), such as a Netronome Agilio NIC, a Mellanox Bluefield NIC, or a Broadcom Stingray NIC. Network interfaces 108A and 108B may also include smart NICs or can include other network interface devices such as NICs, network interface controllers, or network adapters.

Processors 106 and 107C in FIG. 1 can execute instructions, such as instructions from one or more applications executing in a user space 8 of a memory 110 or 111C, or from an Operating System (OS) kernel 10. Processors 106 and 107C can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107C can include a System on a Chip (SoC), which may be combined with a memory 110 or 111C, respectively.

Memories 110 and 111C can include, for example, a volatile Random Access Memory (RAM) such as Static RAM (SRAM), Dynamic RAM (DRAM), or a non-volatile RAM, or other solid-state memory that is used by processors 106 or 107C. Data stored in memory 110 or memory 111C can include data read from another client device 104 or a storage device 103, data to be stored in another client device 104 or a storage device 103, instructions loaded from an application or from an OS for execution by the processor, and/or data used in executing such applications, such as user data 20.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111C may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

As discussed in more detail below, each of memories 110A, 110B, and 111C include a kernel space 6 that is used by an OS kernel 10 (NIC OS kernel 10C in the case of memory 111C) and a user space 8 that is used by one or more applications 18, such as for accessing user data 20. Kernel space 6 and user space 8 can include separate portions of virtual memory mapped to physical addresses in memories 110 or 111C. As will be understood by those of ordinary skill in the art, access to kernel space 6 is generally restricted to OS kernel 10, its kernel extensions, and other portions of an OS, such as device drivers, while access to user space 8 is available to both applications 18 and the OS. In this regard, the OS of each client device 104 or the OS of network interface 108C allocates hardware and software resources, such as memory, network, and processing resources of the device.

As shown in FIG. 1, each kernel space 6 includes caching module 12, shared cache 16, and one or more cache directories 14. In implementations where the OS of the device is Linux, the caching module 12 can include an extended Berkeley Packet Filter (eBPF) program that is executed as an extension of the Linux kernel. Notably, eBPF can enable reprogramming of the kernel behavior without requiring changes to the kernel source code or loading a kernel module. In addition, eBPF includes a verifier to ensure safe execution of eBPF programs. In the example of FIG. 1, caching modules 12 enable OS kernels 10 to access data for the distributed cache in respective shared caches 16 that are stored in kernel spaces 6, as opposed to user spaces 8.

Frequently accessed data can be stored in shared caches 16 using caching modules 12 to accelerate remote memory operations to a nearly line rate without requiring special hardware or changes to the kernel in the case where caching modules 12 are eBPF programs. The remote memory operations, such as read requests and write requests, can be processed at an earlier point in the kernel, as opposed to having to traverse a full network stack and full I/O stack of the kernel to finally be handled by an application in user space 8. For example, caching module 12 may operate at a lower block device driver layer in the I/O stack, without having to pass memory requests through higher layers in the I/O stack, such as a generic block layer and file system layer of the kernel. Similarly, caching module 12 may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed caches due to faster interface standards, such as NVMeOF, and the increasing bandwidths of network hardware. Caching data for the distributed cache in kernel space 6 allows OS kernel 10 to respond quicker on behalf of user space applications 18. Although there is some development in allowing user space applications to bypass the kernel and have direct access to storage or memory devices, such as NVMe devices, such performance improvements will come at the cost of reimplementing complicated default kernel functions in user space. In contrast, the in-kernel caching of the present disclosure can use a kernel extension, such as an eBPF program, which is added to or injected into the kernel without requiring changes to the kernel source code or reloading a kernel module.

In the example of FIG. 1, shared caches 16 can be used by each caching module 12 to share data between kernel space 6 and user space 8. In some implementations, shared caches 16 can include eBPF maps that can provide copies of data to applications 18 in user space 8 and can store data from applications 18. Shared caches 16 can include a data structure, such as a Key Value Store (KVS) or a table, for example. The use of eBPF maps as shared caches 16 can enable different applications 18 in a user space 8 to concurrently access the data stored in a shared cache.

As discussed in more detail below with reference to the example cache directory 14A of FIG. 2, one or more cache directories 14 can be used by each caching module 12 to track information about a status or state of data in the distributed cache, such as a right of access or permission level for the cached data. Cache directories 14 may also be implemented as eBPF maps and can include a data structure, such as a KVS or table.

Those of ordinary skill in the art will appreciate with reference to the present disclosure that other implementations may include a different number or arrangement of client devices 104 and storage devices 103 than shown in the example of FIG. 1. In this regard, network environment 100 shown in FIG. 1 is for the purposes of illustration, and those of ordinary skill in the art will appreciate that network environment 100 may include many more client devices 104, storage devices 103, and additional components, such as routers and switches, than shown in the example of FIG. 1. In addition, those of ordinary skill in the art will appreciate with reference to the present disclosure that the modules and data structures shown in FIG. 1 may differ in other implementations. For example, a shared cache 16 and a cache directory 14 at a client device 104 may be combined in some implementations into a single data structure.

Figure 2:
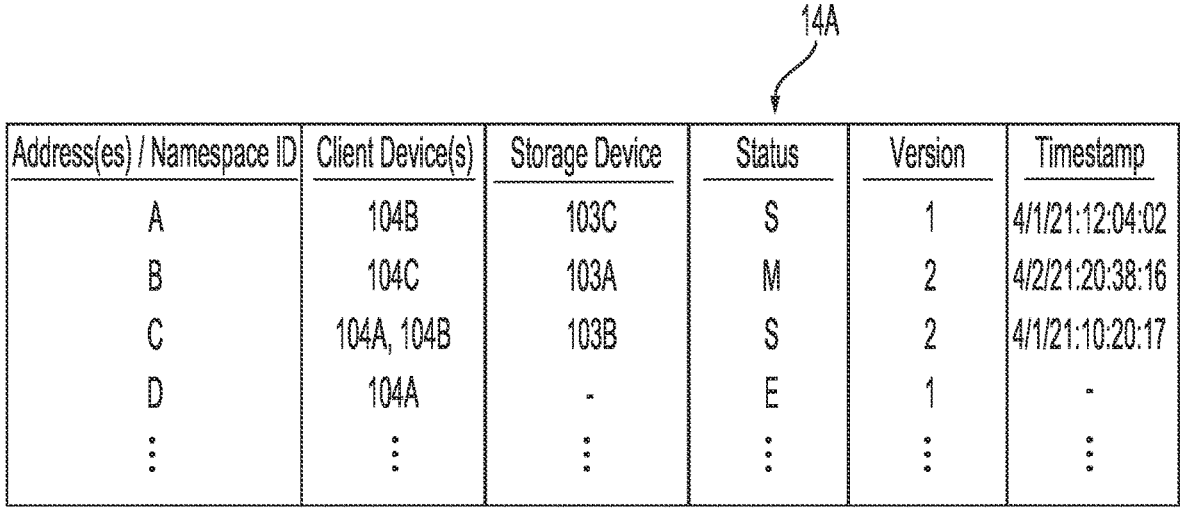
FIG. 2 provides an example of a cache directory maintained in a kernel space of a client device according to one or more embodiments.

FIG. 2 provides an example of cache directory 14A maintained by client device 104A according to one or more embodiments. In the example of FIG. 2, cache directory 14A may be a single data structure or may be formed of multiple data structures stored in kernel space 6A of client device 104A. As noted above, cache directory 14A may form part of shared cache 16A in some implementations. In addition, a mirrored cache directory in some implementations may be stored at another network device, such as at a programmable switch or a Software Defined Networking (SDN) controller.

As shown in FIG. 2, cache directory 14A stored at client device 104A includes logical addresses or namespace IDs for different cached data or cache lines stored in shared cache 16A and/or in network devices in communication with client device 104A (e.g., client devices 104B and 104C and storage devices in FIG. 1). In some cases, the address may indicate a range of addresses, or as in the example of NVMe, a namespace ID for a range of data. For each address, address range, or entry (e.g., row in FIG. 2) in cache directory 14A, the client devices 104 and the storage devices 103 storing the corresponding cached data is indicated, in addition to a status for the cached data, a version number for the cached data, and a timestamp for when the cached data was last modified or authorized to be modified.

In some cases, an address or other indicator of the network device storing the cached data may be included as part of the address or addresses for the cached data. As shown in the example of FIG. 2, cached data corresponding to address A is stored at client device 104B and at storage device 103C. The status for the cached data indicated by address A is shared (i.e., S in FIG. 2), meaning that client device 104B has read-only access that can be shared with other client devices 104. In addition, the version number of 1 for the cached data corresponding to address A indicates that it has not been modified since it was originally stored in storage device 103C at a particular time indicated by the timestamp.

In this regard, different devices in a system implementing a distributed cache may not be exactly synchronized with each other. In some implementations, this challenge is overcome by using a time provided by a "home" storage device that stores the cached data indicating when the cached data was stored or modified at the storage device. Caching module 12A of client device 104A may receive this time in a cache memory message from the home storage device. The use of a home storage device on network 102 that stores the cached data as the serialization point or timekeeper for the cached data can provide a consistent timestamp. The home storage device may also control the access right or permission level (i.e., status in FIG. 2) in some implementations.

In some implementations, caching module 12A may be used for network sniffing or snooping to identify updates to data in the distributed cache that may result in updating a local cache directory. In other cases, caching module 12A may receive updates from other network devices that cause caching module 12A to update cache directory 12A. In both cases, cache directory 14A can be maintained by caching module 12A in the kernel space without involving applications in the user space. This can reduce the overhead on the processor of the client device by not requiring interaction between the kernel and a user space application.

The use of caching module 12A in kernel space 6A of client device 104A can also reduce the latency in processing cache memory messages since the messages often do not need to cross the entire network and I/O stacks of the kernel to reach a user space application. In addition, the user space application does not need to then take up additional processor and memory resources in, for example, performing a system call to respond to cache memory messages, such as requesting an access right, sending cached data from the shared cache to another network device, or writing data to the shared cache from another network device. The outgoing cache messages also do not need to cross the entire network and I/O stacks of the kernel.

In the example of cache directory 14A in FIG. 2, the status of the cached data indicated by address B is modified (i.e., M in FIG. 4), meaning that client device 104C has write access to the cached data. The version number of 2 for the cached data indicates that it has been modified twice since it was originally stored in storage device 103A.

The cache line indicated by address C in cache directory 14A is cached in both client devices 104A and 104B, which have shared read-only copies of the cached data. The cached data has been modified twice since it was originally stored in storage device 103B and was last modified or authorized to be modified by storage device 103B at the time indicated by the corresponding timestamp in cache directory 14A.

As shown in FIG. 2, the cached data indicated by address D is stored in client device 104A with no copies yet stored at a storage device 103. In this regard, client device 104A has exclusive access or permission (i.e., status of E in FIG. 2) to modify the cached data since it has created the data. The cached data has a version number of 1 and does not yet have a timestamp since it has not been stored at a home storage device 103 yet.

As will be appreciated by those of ordinary skill in the art, cache directory 14A may include different information than that shown in FIG. 2. For example, some implementations of cache directory 14A may include usage statistics for different cached data or may not include a separate indication of the storage device storing the cached data since this may be indicated by the address for the cached data. In some implementations, the status in cache directory 14A may only indicate whether a modification of the cached data is in progress, as opposed to a shared, modified, or exclusive status. As another example variation, different cache lines with contiguous addresses may be consolidated in cache directory 14A by representing the cache lines as a range of addresses, so long as the respective information (e.g., network device locations, status, version number, and timestamp) remain the same for all cache lines in the address range. Such maintenance of the cache directory can be performed by caching module 12 in the kernel.

Example Processes

Figure 3:
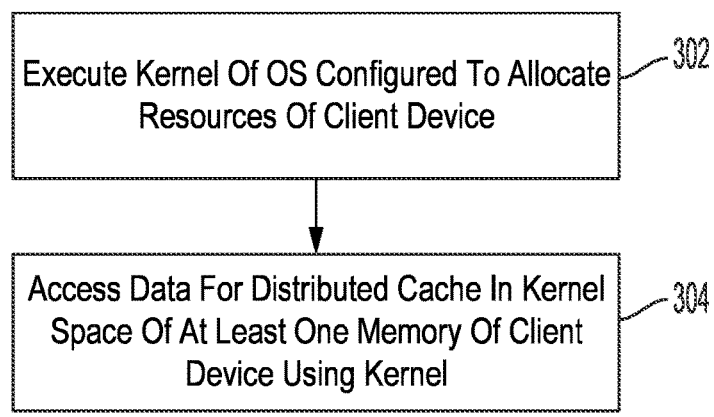
FIG. 3 is a flowchart for an in-kernel caching process according to one or more embodiments.

FIG. 3 is a flowchart for an in-kernel caching process according to one or more embodiments. The process of FIG. 3 may be performed by, for example, a processor of a client device 104 or a processor of network interface 108C in FIG. 1.

In block 302, the processor executes an OS kernel that is configured to allocate resources of a client device. In implementations where the processor executes an OS for a network interface, such as a smart NIC, the processor may use the OS to allocate resources of the network interface, such as ports, memory, and/or processing resources.

In block 304, the processor uses the kernel to access or cache data for a distributed cache in a kernel space of at least one memory of the client device (e.g., a shared cache 16 in FIG. 1). As used herein, accessing data can include reading, modifying, and writing data. A kernel extension (e.g., an eBPF program) may use one or more data structures (e.g., one or more eBPF maps) in a kernel space of a memory that is reserved for the OS. The kernel or kernel extension can then share the data cached in the data structure with user applications that operate in a user space of the client device or the network interface. Those of ordinary skill in the art will appreciate with reference to the present disclosure that the execution of the OS kernel in block 302 overlaps with the accessing of data in block 304.

As discussed in more detail below with reference to the read request and write request processes of FIGS. 4 and 5, the foregoing use of the kernel for caching data in a distributed cache reduces the overhead on the processor by not having to pass all remote memory messages from other network devices (e.g., read requests, write requests, permission requests, cache directory updates, acknowledgments, discovery requests) through the full network stack and full I/O stack of the kernel and to applications in the user space. In addition, the response time to remote memory requests or processing time for remote memory messages is significantly improved since the memory requests and messages can be processed at a much earlier point in the kernel.

The response and processing time for remote memory requests and messages can be even further reduced in implementations where access to the shared memory for the distributed cache is provided by a kernel of a network interface, such as a smart NIC. In this regard, an eBPF program can be added to the kernel of an OS of the network interface to provide a transparent offload of the distributed caching operations from the main processor and/or main memory of the client device to the processor and/or memory of the network interface. Such offloading to a network interface can further reduce the workload or overhead on the client device's main processor (e.g., CPU) to improve the performance or scheduling of tasks for applications executing in user space.

Figure 4:
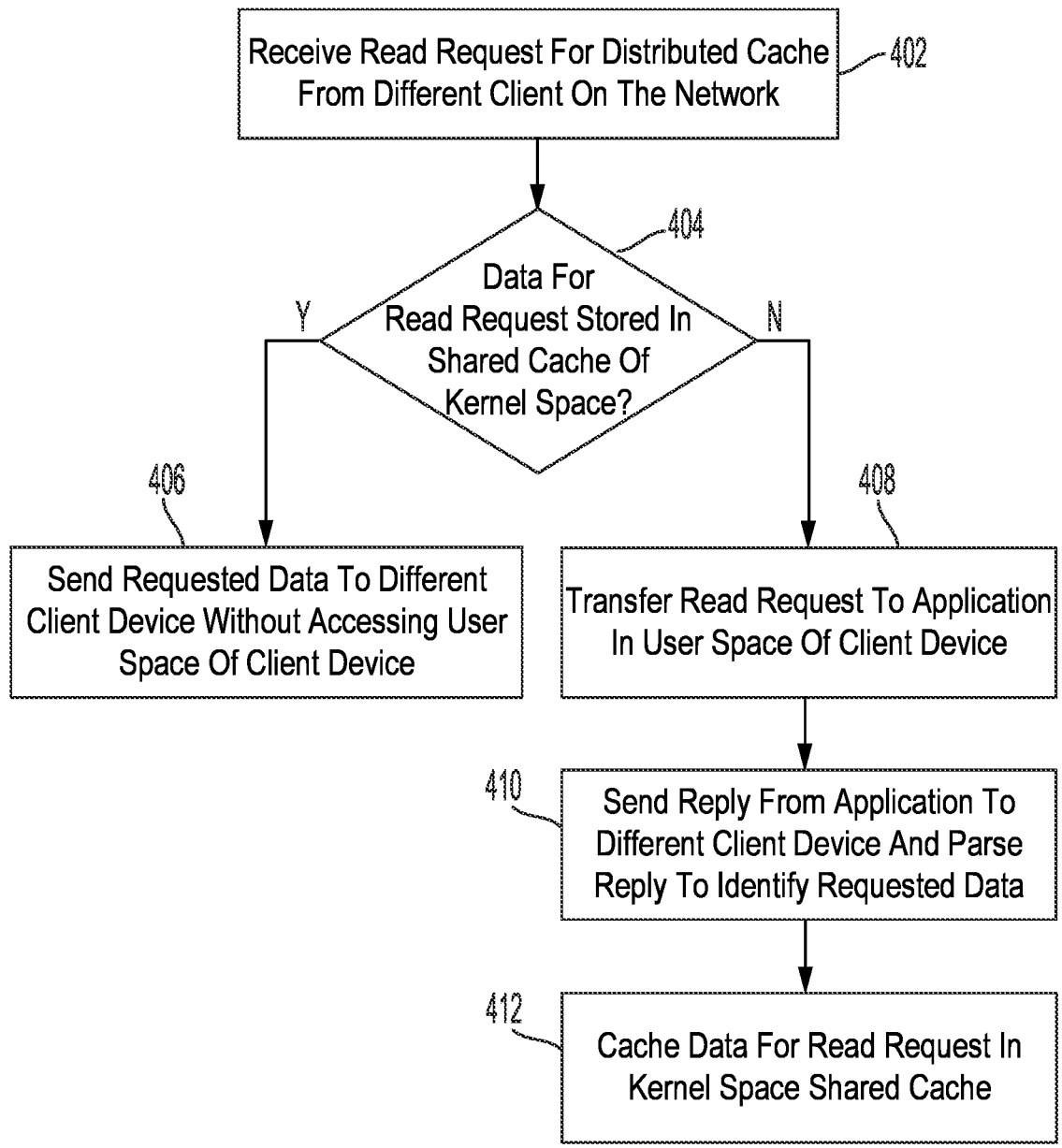
FIG. 4 is a flowchart for a read request process according to one or more embodiments.

FIG. 4 is a flowchart for a read request process according to one or more embodiments. The process of FIG. 4 may be performed by, for example, a processor of a client device 104 or a processor of network interface 108C in FIG. 1.

In block 402, the client device or network interface receives a remote memory read request for a distributed cache from a different client device on a network. A caching module attached to a kernel, such as caching module 12 in FIG. 1, can be used by a processor of the client device or network interface to parse the received message to determine that it is a read request, such as by identifying an opcode in the message.

In block 404, the processor determines whether data for performing the read request is stored in a shared cache of at least one memory of the client device. This can include the caching module or kernel extension performing a lookup in a data structure stored in the kernel space. For example, an eBPF program may perform a lookup for an address or pointer representing an address in an eBPF map implemented as a KVS to determine if the requested data is stored in the shared cache.

If the requested data is stored in the shared cache, the in-kernel caching module executed by the processor in block 406 retrieves the requested data from the shared cache and sends the requested data to the requesting client device without accessing the user space of the client device or the network interface. When the requested data is stored in the shared cache, the caching module can handle the read request without having to fulling traverse all the layers in the kernel and interact with an application in the user space. This can save time in responding to the read request and conserve processing resources of the client device.

On the other hand, if the requested data is not stored in the shared cache, the in-kernel caching module executed by the processor in block 408 transfers the read request to an application in the user space. In this case, the requested data may not have been recently or frequently accessed enough prior to the read request to be cached in the shared cache in the kernel space. The read request may therefore require the application in user space to retrieve the requested data from a user space portion of a memory of the client device, determine that the requested data is not stored at the client device, or require an operation to be performed by the application in user space to generate the requested data.

In block 410, the reply to the read request is sent from the user space application to the kernel, such as through a system call, to send the reply to the requesting client device on the network. The in-kernel caching module in block 410 receives the reply for the read request and parses the reply from the application to determine if the application has returned data in response to the read request and to identify the requested data.

In block 412, the caching module stores the requested data identified in block 410 in the shared cache of the kernel space. In some implementations, the caching module may use a caching policy to determine whether to store the requested data in block 412. For example, the size of the shared cache may be limited so that data that has been less recently accessed by remote network devices and/or less frequently accessed by remote network devices is not stored in the shared cache.

Those of ordinary skill in the art will appreciate with reference to the present disclosure that the blocks for the read request process of FIG. 4 may differ in other implementations. For example, in some implementations, block 410 may not include the caching module identifying the requested data in the reply from the user space application and therefore block 412 may not be performed to store the requested data in the shared cache of the kernel space.

Figure 5:
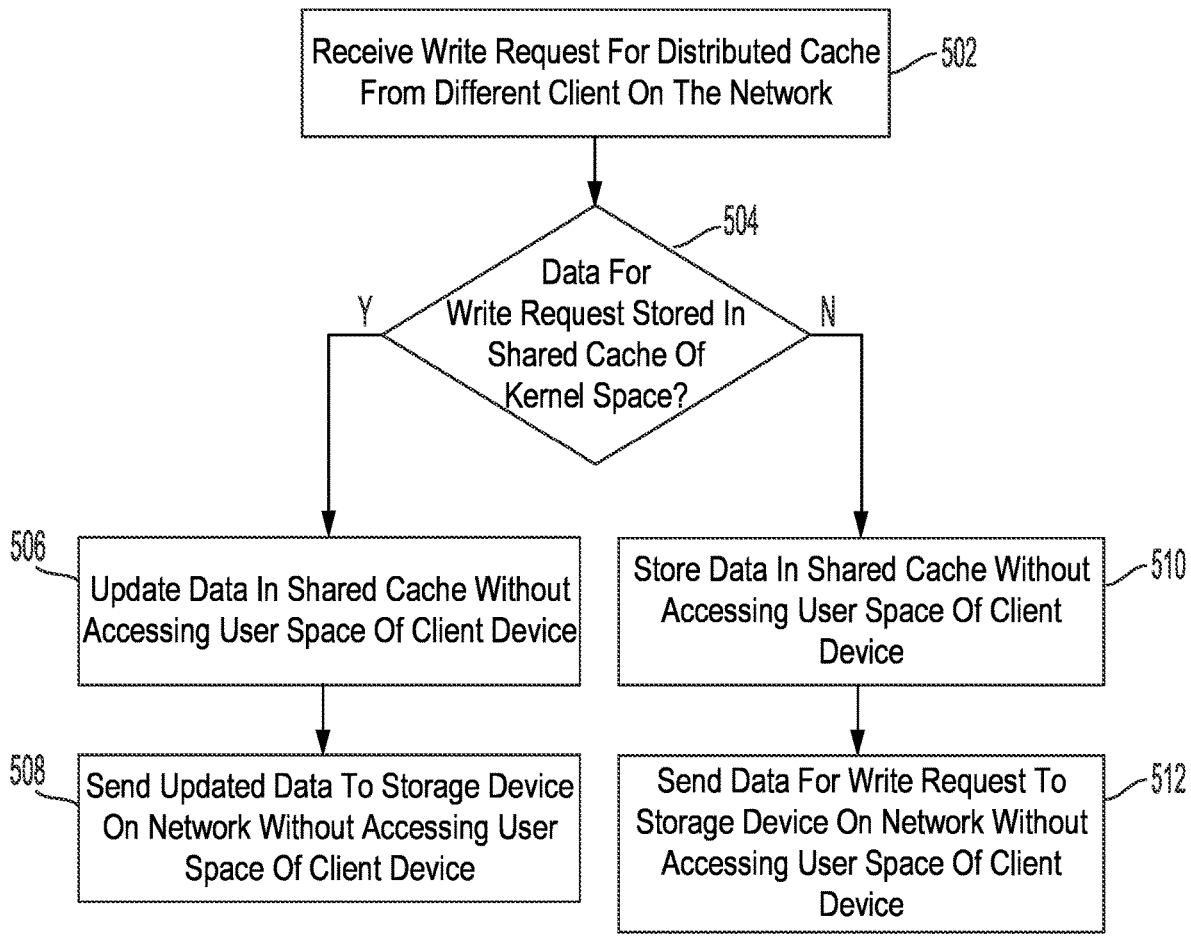
FIG. 5 is a flowchart for a write request process according to one or more embodiments.

FIG. 5 is a flowchart for a write request process according to one or more embodiments. The process of FIG. 5 may be performed by, for example, a processor of a client device 104 or a processor of network interface 108C in FIG. 1.

In block 502, a write request is received for the distributed cache from a different client on the network. A caching module attached to a kernel, such as caching module 12 in FIG. 1, can be used by a processor of the client device or network interface to parse the received message to determine that it is a write request, such as by identifying an opcode in the message.

In block 504, the processor determines whether data corresponding to the write request is stored in a shared cache of at least one memory of the client device. This can include the caching module or kernel extension performing a lookup in a data structure stored in the kernel space for the address or a pointer for the data to be written by the write request. For example, an eBPF program may perform a lookup for an address or key representing an address in an eBPF map implemented as a KVS to determine if the data corresponding to the address, such as a previous version of the data, is already stored in the shared cache.

If data corresponding to the write request is already stored in the shared cache, the in-kernel caching module in block 506 updates the data in the shared cache without accessing the user space of the client device or the network interface. In this regard, the caching module can handle the write request without having to fulling traverse all the layers in the kernel and interact with an application in the user space. This can save time in performing the request and conserve processing resources of the client device. The caching module in block 506 may also send an acknowledgment in some implementations to the different client device to indicate that the data has been written in the shared cache.

In block 508, the caching module sends the updated data for the address or addresses to a storage device on the network without accessing the user space of the client device. As discussed above with reference to the cache directory example of FIG. 2, a storage device on the network may be used as a home node or owner of the cached data in some implementations. In other implementations that do not rely on a home storage device, block 508 may be omitted. In such implementations, the client device may serve as the owner or home node for the data written to its shared cache. In addition, the caching module in block 508 may send a notification in some implementations to other network devices, such as a network controller or SDN controller, to indicate that a cache directory should be updated for the new version of data written in the shared cache.

On the other hand, if it is determined that data corresponding to the write request is not already stored in the shared cache, the caching module in block 510 stores the data in the shared cache without accessing the user space of the client device. As with the update performed in block 506, the processing resources consumed and the time to write new data in the shared cache with its associated processing, such as sending notifications to other network devices, can be reduced by using the kernel to handle the write request and to maintain the shared cache in the kernel space.

In block 512, the caching module sends the data for the write request to a storage device on the network without accessing the user space of the client device. The storage device on the network may be used as a home node or owner of the written data in some implementations. In other implementations that do not rely on a home storage device, block 512 may be omitted. In such implementations, the client device may serve as the owner or home node for the data written to its shared cache. In addition, the caching module in block 512 may send a notification in some implementations to other network devices, such as a network controller or SDN controller, to indicate that a cache directory should be updated for the newly written data in the shared cache.

Those of ordinary skill in the art will appreciate with reference to the present disclosure that the blocks for the write process of FIG. 5 may differ in other implementations. For example, blocks 508 and 512 may be omitted in some implementations where data for the distributed cache is not stored in separate storage devices in addition to a copy stored in one or more shared caches of the client devices.

As discussed above, the foregoing use of in-kernel caching for a distributed cache can reduce the latency in handling memory messages, such as read requests, write requests, permission requests, status updates, and/or acknowledgments, since the memory messages do not need to be processed through the full network and I/O stacks of the kernel and then processed by an application in the user space. In addition to reducing the latency for the distributed cache, the foregoing use of in-kernel caching can also reduce the workload or overhead on the processor (e.g., CPU) of the client device by requiring less interactions between the kernel space and the user space.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A client device, comprising:
at least one memory configured to be used at least in part as a shared cache in a distributed cache;
a network interface configured to communicate with one or more other client devices on a network, the one or more other client devices each configured to provide a respective shared cache for the distributed cache; and
at least one processor configured to execute a kernel of an Operating System (OS), wherein the shared cache is located in a kernel space of the at least one memory and the kernel is configured to:
receive, via the network interface, a read request for the distributed cache from a different client device on the network;
determine whether data for performing the read request is stored in the shared cache of the at least one memory; and
in response to determining that the data for performing the read request is not stored in the shared cache, transfer the read request to an application in a user space of the at least one memory of the client device.

2. The client device of claim 1, wherein the kernel is further configured to access data for the distributed cache in the kernel space using an extended Berkeley Packet Filter (eBPF) program.

3. The client device of claim 1, wherein the shared cache includes an extended Berkeley Packet Filter (eBPF) map in the kernel space.

4. The client device of claim 1, wherein the kernel is further configured to store at least one data structure as an extended Berkeley Packet Filter (eBPF) map in the kernel space indicating at least one of a permission level and a status for data stored in the distributed cache.

5. The client device of claim 1, wherein the at least one processor is further configured to execute a plurality of user space applications, wherein each user space application of the plurality of user space applications has access to an extended Berkeley Packet Filter (eBPF) map in the kernel space to perform a lookup to determine whether data requested by the user space application is available in the distributed cache.

6. The client device of claim 1, wherein the kernel is further configured to:
in response to determining that the data for performing the read request is stored in the shared cache, send the requested data to the different client device via the network interface without accessing the user space of the at least one memory.

7. The client device of claim 1, wherein the kernel is further configured to:
in response to transferring the read request to the application in the user space:
receive a reply for the read request from the application in the user space; and
store the requested data from the reply in the shared cache.

8. The client device of claim 1, wherein the kernel is further configured to:
receive, via the network interface, a write request to store data in the distributed cache from a different client device on the network;
determine whether data corresponding to the write request is stored in the shared cache of the at least one memory; and
in response to determining that the data corresponding to the write request is stored in the shared cache:
update the data stored in the shared cache based on the write request without accessing the user space of the at least one memory; and
send the updated data via the network interface to a storage device on the network to update the data at the storage device without accessing the user space of the at least one memory.

9. The client device of claim 8, wherein the kernel is further configured to:
in response to determining that the data corresponding to the write request is not stored in the shared cache:
store the data for the write request in the shared cache; and
send the data for the write request, via the network interface, to the storage device on the network to store the data at the storage device.

10. The client device of claim 1, wherein the network interface includes the at least one processor configured to execute the kernel.

11. A client device, comprising:
at least one memory configured to be used at least in part as a shared cache in a distributed cache; and
means for:
communicating with one or more other client devices on a network, the one or more other client devices each configured to provide a respective shared cache for the distributed cache; and
executing a kernel of an Operating System (OS), wherein the kernel is configured to:
receive a read request for the distributed cache from a different client device on the network;
determine whether data for performing the read request is stored in the shared cache of the at least one memory; and
in response to determining that the data for performing the read request is not stored in the shared cache, transfer the read request to an application in a user space of the at least one memory of the client device.

12. A method, comprising:
executing a kernel of an Operating System (OS) configured to allocate resources of a client device;
using at least a portion of at least one memory of the client device as a shared cache in a distributed cache, wherein the shared cache is located in a kernel space of the at least one memory, and wherein the distributed cache includes respective shared memories of one or more other client devices on a network;
receiving, by the client device, a read request for the distributed cache from a different client device on the network;
determining whether data for performing the read request is stored in the shared cache of the at least one memory of the client device;
in response to determining that the data for performing the read request is stored in the shared cache, sending the requested data to the different client device without accessing a user space of the client device; and in response to determining that the data for performing the read request is not stored in the shared cache, transferring the read request to an application in the user space of the client device.

13. The method of claim 12, further comprising accessing data for the distributed cache by the kernel using an extended Berkeley Packet Filter (eBPF) program as an extension to the kernel.

14. The method of claim 12, wherein the shared cache includes an extended Berkeley Packet Filter (eBPF) map.

15. The method of claim 12, further comprising storing at least one data structure as an extended Berkeley Packet Filter (eBPF) map in the kernel space indicating at least one of a permission level and a status for data stored in the distributed cache.

16. The method of claim 12, further comprising:
executing, by the client device, the user space application; and determining whether data requested by the user space application is available in the distributed cache by accessing an extended Berkeley Packet Filter (eBPF) map in the kernel space.

17. The method of claim 12, further comprising:
receiving, by the client device, a write request to store data in the distributed cache from a different client device on the network; and determining whether data corresponding to the write request is stored in the shared cache of the at least one memory of the client device.

18. The method of claim 17, further comprising:
updating the data in the shared cache based on the write request without accessing the user space of the client device; and sending the updated data to a storage device on the network to update the data at the storage device without accessing the user space of the client device.

19. The method of claim 17, further comprising:
in response to determining that the data corresponding to the write request is not stored in the shared cache:
storing the data for the write request in the shared cache; and sending the data for the write request to a storage device on the network to store the data at the storage device.

20. The method of claim 12, further comprising:
in response to transferring the read request to the application in the user space:
receiving a reply for the read request from the application in the user space; and storing the requested data from the reply in the shared cache.

* * * * *